(12) United States Patent
Wang et al.

(10) Patent No.: US 7,431,775 B2
(45) Date of Patent: *Oct. 7, 2008

(54) LIQUID DETERGENT FORMULATION WITH HYDROGEN PEROXIDE

(75) Inventors: Xue Wang, King of Prussia, PA (US); Keith R. Genco, Pottstown, PA (US); Donn Rubingh, Cincinnati, OH (US)

(73) Assignee: Arkema Inc., Philadelphia, PA (US)

( * ) Notice: Subject to any disclaimer, the term of this patent is extended or adjusted under 35 U.S.C. 154(b) by 95 days.

This patent is subject to a terminal disclaimer.

(21) Appl. No.: 11/588,765

(22) Filed: Oct. 27, 2006

(65) Prior Publication Data

US 2007/0087954 A1 Apr. 19, 2007

Related U.S. Application Data

(63) Continuation-in-part of application No. 10/820,981, filed on Apr. 8, 2004, now Pat. No. 7,169,237.

(51) Int. Cl.
*C01B 15/37* (2006.01)
*B08B 3/08* (2006.01)
*C11D 7/18* (2006.01)

(52) U.S. Cl. ............. 134/42; 252/186.29; 423/272; 423/273; 510/375

(58) Field of Classification Search ............. 134/42; 423/272, 273; 252/186.29; 510/375
See application file for complete search history.

(56) References Cited

U.S. PATENT DOCUMENTS

| | | | |
|---|---|---|---|
| 2,782,100 A | 2/1957 | Greenspan | |
| 3,122,417 A | 2/1964 | Blaser et al. | 423/272 |
| 3,383,174 A | 5/1968 | Carnine et al. | 423/273 |
| 3,387,939 A | 6/1968 | Reilly | |
| 3,681,022 A | 8/1972 | Kibbel | |
| 3,781,409 A | 12/1973 | Munday et al. | 423/273 |
| 4,061,721 A | 12/1977 | Strong | 423/272 |
| 4,070,442 A | 1/1978 | Watts | 423/272 |
| 4,294,575 A | 10/1981 | Kowalski | |
| 4,304,762 A | 12/1981 | Leigh | 423/272 |
| 4,525,291 A | 6/1985 | Smith | |
| 4,552,668 A | 11/1985 | Brown | |
| 4,552,675 A | 11/1985 | Brown | |
| 4,839,156 A | 6/1989 | Ng et al. | |
| 4,981,662 A | 1/1991 | Dougherty | 423/272 |
| 5,078,672 A | 1/1992 | Dougherty et al. | 494/37 |
| 5,102,575 A | 4/1992 | Lanniel | |
| 5,130,053 A | 7/1992 | Feasey et al. | 252/400.22 |
| 5,217,710 A | 6/1993 | Williams | |
| 5,302,311 A | 4/1994 | Sugihara et al. | 510/175 |
| 5,372,802 A | 12/1994 | Barrows | |
| 5,728,699 A | 3/1998 | Tyerech | |
| 5,733,474 A | 3/1998 | Kagermeier | |
| 5,736,497 A | 4/1998 | Steiner | |
| 5,900,256 A | 5/1999 | Scoville et al. | 423/478 |
| 5,997,764 A | 12/1999 | Ambuter | |
| 6,083,422 A | 7/2000 | Ambuter | |
| 6,495,501 B1 | 12/2002 | Del Duca | |
| 6,536,628 B2 | 3/2003 | Montgomery | |
| 6,576,213 B1 | 6/2003 | Landfors et al. | 423/478 |
| 7,169,237 B2 * | 1/2007 | Wang et al. | 134/42 |
| 7,341,636 B2 * | 3/2008 | Wang et al. | 134/42 |
| 2002/0114757 A1 | 8/2002 | Tenney | |
| 2003/0073150 A1 | 4/2003 | Woerner | |
| 2003/0162685 A1 | 8/2003 | Man et al. | |

FOREIGN PATENT DOCUMENTS

| | | |
|---|---|---|
| EP | 0 376 704 A1 | 7/1990 |
| EP | 0426949 A1 | 5/1991 |
| JP | 04349109 A | 12/1992 |
| WO | 9109807 A2 | 7/1991 |
| WO | WO 92/19287 A1 | 11/1992 |
| WO | WO 93/22273 A1 | 11/1993 |
| WO | WO 96/09983 | 4/1996 |
| WO | WO 99/18180 A1 | 4/1999 |

* cited by examiner

*Primary Examiner*—Wayne Langel
(74) *Attorney, Agent, or Firm*—Steven D. Boyd

(57) ABSTRACT

A stabilized basic aqueous liquid detergent composition is disclosed. The composition comprises hydrogen peroxide, a hydrogen peroxide stabilizer or a mixture of hydrogen peroxide stabilizers, an anionic surfactant or mixture of anionic surfactants, a non-ionic surfactant or mixture of anionic surfactants, and a builder or a mixture of builders. The composition maintains a homogeneous single phase, maintains active oxygen level, and gives a high level of cleaning performance.

25 Claims, 2 Drawing Sheets

LIQUID DETERGENT FORMULATION WITH HYDROGEN PEROXIDE

CROSS-REFERENCE TO RELATED APPLICATIONS

This application is a continuation-in-part of U.S. patent application Ser. No. 10/820,981, filed Apr. 8, 2004, now U.S. Pat. No. 7,169,237, allowed Jun. 21, 2006, incorporated herein by reference.

FIELD OF THE INVENTION

This invention relates to cleaning agents. In particular, this invention relates to hydrogen peroxide containing stabilized basic aqueous liquid detergent compositions.

BACKGROUND OF THE INVENTION

To avoid the disadvantages inherent in the use of hypochlorite solutions in household laundry bleach, disinfectants, hard surface cleansers, and other cleaning agents, manufacturers of these products have developed alternatives based on acidic aqueous hydrogen peroxides. Hydrogen peroxide is generally acceptable from a toxicological and environmental standpoint because its decomposition products are oxygen and water. In addition, these cleaning agents are also fiber-safe and color-safe.

Decomposition of hydrogen peroxide caused by catalytically active substances, such as metal ions, is extremely difficult to prevent. For products that contain hydrogen peroxide to be effective, a substantial proportion of the hydrogen peroxide must survive between manufacture and use. In addition, decomposition produces oxygen gas, which could overpressure the container and cause it to rupture during storage or shipping. Examples of such compositions are given, for example, in Kott, U.S. Pat. No. 5,641,739; Scialla, U.S. Pat. No. 5,559,090; Monticello, U.S. Pat. No. 6,106,774; and Kandathil, U.S. Pat. No. 4,238,192.

Because an alkaline environment is normally required for cleaning efficiency, the performance of hydrogen peroxide containing cleaning agents can be improved by formulating alkaline products. However, the commercial use of alkaline formulations has been hindered by the strong tendency of alkaline hydrogen peroxides to decompose during storage. In addition, under typical storage conditions, decomposition may produce hydroxide ions, which increase the pH and, thus, further increase the decomposition rate. With excessive decomposition of the hydrogen peroxide, the composition loses its cleaning ability.

Liquid detergent compositions offer several advantages over solid compositions. For example, liquid compositions are easier to measure and dispense. Additionally, liquid compositions are especially useful for direct application to heavily soiled areas on fabrics, after which the pre-treated fabrics can be placed in an aqueous bath for laundering in the ordinary manner.

Thus, a need exists for hydrogen peroxide containing aqueous basic liquid detergent compositions, which maintain a homogeneous single phase, maintain active oxygen level, and give a high level of cleaning performance.

SUMMARY OF THE INVENTION

In one aspect, the invention is a stabilized basic aqueous liquid detergent composition comprising hydrogen peroxide. The liquid detergent composition maintains a homogeneous single phase, maintains active oxygen level, and gives a high level of cleaning performance. The composition comprises:
  a) 0.1 wt % to 15% of hydrogen peroxide;
  b) about 10 ppm by weight to about 1 wt % of a stannate stabilizer;
  c) at least about 10 ppm by weight of a phosphonic acid chelating agent or a mixture of phosphonic acid chelating agents;
  d) at least about 10 ppm by weight of an aromatic chelating agent or a mixture of aromatic chelating agents;
  e) optionally, a sequestrant or a mixture of sequestrants;
  f) 0.1 wt % to 60 wt % of an anionic surfactant or mixture of anionic surfactants;
  g) 0.1 wt % to 60 wt % of a non-ionic surfactant or mixture of non-ionic surfactants;
  e) 0.1 wt % to 60 wt % of a builder or a mixture of builders;
  f) water; and
  in which:
  the phosphonic acid chelating agent or agents, the aromatic chelating agent or agents, and the sequestrant or sequestrants together comprise about 20 ppm by weight to 10 wt % of the composition;
  the composition comprises less than about 10 ppm of pyrophosphate;
  the composition has a pH greater than 7.0; and
  the amount of active oxygen lost when the composition is heated at 85±1° C. for 24 hours is 20% or less.

The liquid detergent composition may also comprise other ingredients that are conventional components of liquid detergent compositions.

In another aspect invention is a method of cleaning by applying the liquid detergent composition to a substrate.

DETAILED DESCRIPTION OF THE INVENTION

Figure 1:
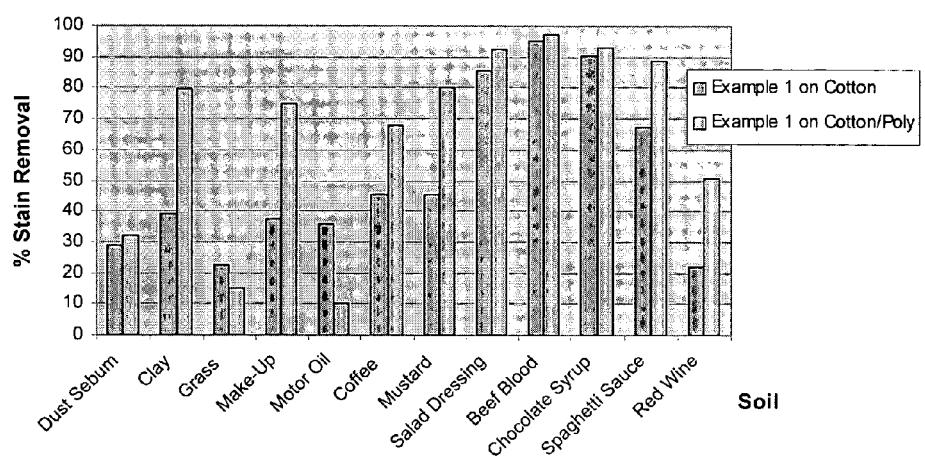
FIG. 1 shows the cleaning performance of the composition of Example 1 on cotton fabric and on cotton/polyester fabric.

Unless the context indicates otherwise, in the specification and claims, the terms, anionic surfactant, non-ionic surfactant, phosphonic acid chelating agent, aromatic chelating agent, sequeserant, builder, colorant, fluorescent whitening agent, fragrance, and similar terms also include mixtures of such materials. Unless otherwise specified, all percentages are percentages by weight and all temperatures are in degrees Centigrade (degrees Celsius).

In one aspect, the invention is a stabilized basic aqueous liquid detergent composition. The composition comprises hydrogen peroxide; a stannate stabilizer; a phosphonic acid chelating agent or a mixture of phosphonic acid chelating agents; an aromatic chelating agent or a mixture of aromatic chelating agents; optionally, a sequestrant or a mixture of sequestrates; an anionic surfactant or mixture of anionic surfactants; a non-ionic surfactant or mixture of anionic surfactants; and a builder or a mixture of builders. As used herein, the terms "sequeserant" and "sequeserant" do not include the aromatic chelating agents and the phosphonic acid chelating agents described herein. Other materials that are conventional ingredients of cleaning agents may also be present, except that the composition is not compatible with ammonia based compositions. Water comprises the balance of the composition. Typically, no organic solvents or inorganic solvents other than water are necessary or present in the stabilized basic aqueous liquid detergent composition.

All the ingredients should be free from metal ions that would catalyze decomposition of hydrogen peroxide, such as ferrous ions, ferric ions, cupric ions, cuprous ions, manganous ions, and similar transition metal ions. The ingredients should also be free from both organic and inorganic materials that would react with the hydrogen peroxide. Ingredients useful in cleaning agents are disclosed, for example, in Roselle, U.S. Pat. No. 5,244,593; Gosselink, U.S. Pat. No. 4,702,857; Wise, U.S. Pat. No. 4,166,039; Laughlin, U.S. Pat. No. 3,929,678; Heltovics, U.S. Pat. No. 6,472,364; and Casell, U.S. Pat. No. 7,091,171, the disclosures of which are all incorporated herein by reference.

The stabilized basic aqueous liquid detergent composition comprises less than about 10 ppm pyrophosphate, typically less than 1 ppm of pyrophosphate. It has a pH of at least 7.0, typically greater than 7.0, and preferably about 8.0 to about 10.5.

Hydrogen Peroxide

The stabilized basic aqueous liquid detergent composition typically comprises about 0.1 wt % to about 15 wt %, typically about 1 wt % to about 10 wt %, more typically about 2 wt % to about 8 wt %, even more typically about 3 wt % to about 5 wt %, of hydrogen peroxide. Hydrogen peroxide ($H_2O_2$) is commercially available, and its preparation has been described in numerous patents and publication. The anthraquinone process (also called the autoxidation process or the Riedl-Pfleiderer process) is described, for example, in Riedl, U.S. Pat. No. 2,158,525, and in the *Kirk-Othmer Encyclopedia of Chemical Technology*, 3rd. ed., Volume 13, Wiley, N.Y. 1981, pp. 15-22.

The hydrogen peroxide is stabilized by a stabilizer system made up of three components: a stannate stabilizer, a phosphonic acid chelating agent or mixture of phosphonic acid chelating agents, and an aromatic chelating agent or mixture of aromatic chelating agents. Stabilized basic aqueous hydrogen peroxide is described in Published U.S. pat. application Ser. No. 2005/0226800 A1, the disclosure of which is incorporated herein by reference, and stabilized thickened hydrogen peroxide containing systems are described in Wang, U.S. Pat. No. 7,045,493, the disclosure of which is incorporated herein by reference.

The stabilized basic aqueous liquid detergent composition comprises a stannate stabilizer. The stannate stabilizer may be formed in situ from hydrolysis of a tin compound, such as tin sulfate, sodium stannate ($Na_2SnO_3 \cdot 3(H_2O)$), tin dichloride, or tin tetrachloride. Although the stannate stabilizer is believed to be colloidal stannic oxide, it is typically referred to as colloidal sodium stannate.

The stabilized basic aqueous liquid detergent composition comprises at least one phosphonic acid chelating agent. Phosphonic acid chelating agents include, for example, compounds of the general structure $N(CR^1R^2PO_3H_2)_3$, in which $R^1$ and $R^2$ are each independently hydrogen or an alkyl group of one to four carbon atoms, such as amino tri(methylene phosphonic acid) (ATMP) (DEQUEST® 2000, Solutia, St. Louis, Mo., USA), in which $R^1$ and $R^2$ are each hydrogen; diethylene triamine penta(methylene phosphonic acid) (DTPA) (DEQUEST® 2066); hexamethylene diamine tetra (methylene phosphonic acid) (DEQUEST® 2054); bis hexamethylene triamine penta methylene phosphonic acid (DEQUEST® 2090); and compounds of the general structure $C(R^3)(PO_3H_2)_2OH$, in which $R^3$ is hydrogen or an alkyl group of one to four carbon atoms, such as 1-hydroxyethylidene-1,1-diphosphonic acid (HEDP) (DEQUEST® 2010) ($C(CH_3)(PO_3H_2)_2OH$). Preferred phosphorus-based chelating agents include 1-hydroxyethylidene-1,1-diphosphonic acid, amino tri(methylene phosphonic acid), and diethylene triamine penta(methylene phosphonic acid).

The stabilized basic aqueous liquid detergent composition comprises at least one aromatic chelating agent. The aromatic structure includes carbocyclic aromatic rings, such as the benzene or naphthalene ring, as well as heteroaromatic rings such as pyridine and quinoline. The stabilizer should also contain chelating groups, such as hydroxyl, carboxyl, phosphonate, or sulfonate. The aromatic chelating agent may be, for example, salicylic acid; a substituted salicylic acid, such as 3-methylsalicylic acid, 4-methyl salicylic acid, 5-methyl salicylic acid, 6-methyl salicylic acid, 3,5-dimethyl salicylic acid, 3-ethyl salicylic acid, 3-iso-propyl salicylic acid, 3-methoxy salicylic acid, 4-methoxy salicylic acid, 5-methyoxy salicylic acid, 6-methoxy salicylic acid, 4-ethoxy salicylic acid, 5-ethyoxy salicylic acid, 2-chloro salicylic acid, 3-chloro salicylic acid, 4-chloro salicylic acid, 5-choloro salicylic acid, 3,5-dichloro salicylic acid, 4-fluoro salicylic acid, 5-fluoro salicylic acid, 6-fluoro salicylic acid; or a mixture thereof. The aromatic chelating agent may be, for example, 8-hydroxy-quinoline; a substituted 8-hydroxy-quinoline, such as, 5-methyl-8-hydroxy-quinoline, 5-methoxy-8-hydroxy-quinoline, 5-chloro-8-hydroxy-quinoline, 5,7-dichloro-8-hydroxy-quinoline, 8-hydroxy-quinoline-5-sulfonic acid, or a mixture thereof. The aromatic chelating agent may be, for example, a pyridine-2-carboxylic acid, such as picolinic acid (2-pyridinecarboxylic aid); dipicolinic acid (2,6-pyridinedicarbxylic acid); 6-hydroxy-picolinic acid; a substituted 6-hydroxy-picolinic acid, such as 3-methyl-6-hydroxy-picolinic acid, 3-methoxy-6-hydroxy-picolinic acid, 3-chloro-6-hydroxy-picolinic acid, 3,5-dichloro-6-hydroxy-picolinic acid; or a mixture thereof. Preferred aromatic chelating agents include, salicylic acid, 6-hydroxy-picolinic acid, and 8-hydroxy-quinoline.

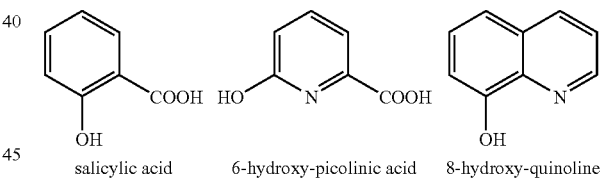

salicylic acid     6-hydroxy-picolinic acid     8-hydroxy-quinoline

As will be apparent to those skilled in the art, in basic solution one or more of these components may be present as its corresponding anion or anions, or as an equilibrium mixture of the component and its corresponding anion or anions. Anions of these components and mixtures of these components and their corresponding anion and/or anions are included in the definition of each of these components and are within the scope of the claims.

It has been found that pyrophosphates, commonly used in hydrogen peroxide stabilization, actually destabilize peroxide under the alkaline conditions. Therefore, the stabilized basic aqueous liquid detergent compositions are preferably pyrophosphate free. However, as will be apparent to those skilled in the art, low levels of pyrophosphate may have been added to concentrated hydrogen peroxide by the manufacturer. This low level of pyrophosphate will be present in the concentrated hydrogen peroxide when the stabilized basic aqueous liquid detergent composition is prepared. However, no additional pyrophosphate is added when the stabilized basic aqueous liquid detergent composition is prepared.

Although the stabilized basic aqueous liquid detergent composition preferably does not contain any pyrophosphate, less than 10 ppm, preferably less that 1 ppm, of pyrophosphate may be present.

To stabilize the hydrogen peroxide in the stabilized basic aqueous liquid detergent composition, the composition comprises about 10 ppm to about 1%, preferably about 15 ppm to about 2500 ppm (0.25%), more preferably about 20 ppm to about 1000 ppm (0.1%), even more preferably about 50 ppm to about 500 ppm, of the stannate stabilizer. The composition comprises about 10 ppm to about 1%, preferably about 15 ppm to about 2500 ppm (0.25%), more preferably about 20 ppm to about 1000 ppm (0.1%), even more preferably about 30 ppm to about 500 ppm, of the phosphonic acid chelating agent or, if more than one phosphonic acid chelating agent is used, of the mixture of phosphonic acid chelating agents. The composition comprises about 10 ppm to about 1%, preferably about 15 ppm to about 2500 ppm (0.25%), more preferably about 20 ppm about to 1000 ppm (0.1%) of the aromatic chelating agent or, if more than one chelating agent is used, of the mixture of chelating agents. In one embodiment, the composition comprises about 30 ppm to about 300 ppm, typically 40 ppm to 200 ppm, of each of the three components.

Typically, the upper limit for each of these three components will be determined by economics and by the degree of stabilization required. However, as described below, higher concentrations of the chelating agents than required for stabilization of the hydrogen peroxide may be present in the stabilized basic aqueous liquid detergent composition because these materials can act as sequeserants. However, as used herein, the terms "sequeserant" and "sequeserants" do not include the aromatic chelating agents and the phosphonic acid chelating agents.

Sequeserant

The stabilized basic aqueous liquid detergent composition may comprise a sequeserant or a mixture of sequestrants to sequester ions such as the calcium cation and the magnesium cation, as well as ions such as the iron, manganese, and copper cations. Typical sequeserants include, for example, polyaminocarboxylic acids such as ethylenediamine-N,N'-disuccinic acid (EDDS), ethylenediamine tetraacetic acid (EDTA), N-hydroxyethylenediamine triacetic acid, nitrilotriacetic acid (NTA), ethylene diamine tetrapropionic acid, ethylenediamine-N,N'-diglutamic acid, 2-hydroxypropylenediamine-N,N'-disuccinic acid, triethylenetetraamine hexacetic acid, diethylenetriamine pentaacetic acid (DETPA), trans 1,2 diaminocyclohexane-N,N,N',N'-tetraacetic acid, ethanoldiglycine, and iminodiacetic acid derivatives such as 2-hydroxyethyl diacetic acid or glyceryl iminodiacetic acid.

The aromatic chelating agents and the phosphonic acid chelating agents described above can also be used as sequeserants so the amount of these compounds present in the composition may be greater than the amount required for stabilization of the hydrogen peroxide. However, as used herein, the terms "sequeserant" and "sequeserants" do not include the aromatic chelating agents and the phosphonic acid chelating agents described above. The total amount of 1) phosphonic acid chelating agent or agents, 2) aromatic chelating agent or agents, and 3) sequeserant or sequeserants present in the stabilized basic aqueous liquid detergent composition is about 20 ppm to about 10.0 wt %, preferably 30 ppm to 7.5 wt %, more preferably 40 ppm to 5.0 wt %, and most preferably 80 ppm to 2.5 wt %, based on the weight of the stabilized basic aqueous liquid detergent composition.

Anionic Surfactant

The stabilized basic aqueous liquid detergent composition comprises about 0.1 wt % to about 60 wt %, preferably about 1 wt % to about 30 wt %, more preferably about 1 wt % to about 20 wt %, of an anionic surfactant or a mixture of anionic surfactants. Anionic surfactants are well known to those skilled in the art. Typical anionic surfactants include sulfates and sulfonate salts, such as $C_8$ to $C_{12}$ alkylbenzene sulfonates, $C_{12}$ to $C_{16}$ alkane sulfonates, $C_{12}$ to $C_{16}$ alkyl sulfates, $C_{12}$ to $C_{16}$ alkylsulfosuccinates, and sulfates of ethoxylated and propoxylated alcohols, such as those described above. Typical anionic surfactants include, for example, sodium cetyl sulfate, sodium lauryl sulfate, sodium myristyl sulfate, sodium stearyl sulfate, sodium dodecylbenzene sulfonate, and sodium polyoxyethylene lauryl ether sulfate. Sodium lauryl (dodecyl) sulfate (SLS) is commonly used in cleaning agents.

Non-Ionic Surfactant

The stabilized basic aqueous hydrogen peroxide comprises about 0.1 wt % to 60 wt %, preferably about 1 wt % to about 30 wt %, more preferably about 1 wt % to about 20 wt %, of a non-ionic surfactant or a mixture of non-ionic surfactants. Non-ionic surfactants are well known to those skilled in the art.

Non-ionic surfactants are typically condensation products of a hydrophobic organic aliphatic compound, such as a long chain aliphatic alcohol, with hydrophilic ethylene oxide and/or propylene oxide. The length of the resulting polyether chain can be adjusted to achieve the desired balance between the hydrophobic and hydrophilic properties.

Non-ionic surfactants are disclosed, for example, in Wise, U.S. Pat. No. 4,166,039, column 12, line 47, to column 15, line 23, incorporated herein by reference. Non-ionic surfactants include, for example, ethoxylated, propoxylated and ethoxylated/-propoxylated alcohols, especially $C_{10-20}$ alcohols, with 2 to 100 moles of ethylene oxide and/or propylene oxide per mole of alcohol, especially ethoxylates of primary alcohols containing about 8 to 18 carbon atoms in a straight or branched chain configuration with about 5 to 30 moles of ethylene oxide, for example, the ethoxylates of dodecyl alcohol, undecyl alcohol, decyl alcohol, nonyl alcohol, cetyl alcohol, lauryl alcohol, or myristyl alcohol; ethoxylates of secondary aliphatic alcohols containing 8 to 18 carbon atoms in a straight or branched chain configuration with 5 to 30 moles of ethylene oxide; condensation of aliphatic alcohols containing about 8 to abut 20 carbon atoms with ethylene oxide and propylene oxide; polyethylene glycol and polyethylene oxide; ethoxylated castor oil; ethoxylated hydrogenated castor oil; ethoxylated coconut oil; ethoxylated lanolin; ethoxylated tall oil; ethoxylated tallow alcohol; and ethoxylates of sorbitan esters.

Builder

The stabilized basic aqueous liquid detergent composition comprises about 0.1 wt % to about 60 wt %, preferably about 1 wt % to about 30 wt %, more preferably about 1 wt % to about 20 wt %, of a builder or a mixture of builders. A builder is typically added to increase the cleaning action of the surfactants. Builders that may be used in the composition include, for example, zeolites; silicates; sodium carbonate; glycolic acid; poly(carboxylic acids), such as citric acid, tartaric acid, lactic acid, and their water soluble salts. Phosphates, such as pyrophophates, polyphosphates, and sodium tripolyphosphate are not preferred for environmental reasons.

Further, pyrophosphates were found to destabilize basic hydrogen peroxide and should not be used in the composition. A typical builder for use in the stabilized basic aqueous liquid detergent composition is citric acid.

Other Ingredients

Because aqueous hydrogen peroxides solutions are typically acidic, it is typically necessary to add base, such as aqueous sodium hydroxide or aqueous potassium hydroxide, to the composition until the desired pH is attained. Aqueous sodium hydroxide is preferred. The stabilized basic aqueous liquid detergent composition is a single phase liquid with a pH equal to or greater than 7.0, suitably greater than 7.0, typically about 8.0 to about 10.5, more typically about 8.0 to about 10.0, preferably about 8.0 to about 9.5. Although a buffer, such as a borate buffer, may be included to maintain pH at the desired value, this is typically not necessary. When a carboxylic acid, especially a polycarboxylic acid such as citric acid, is used as the builder, it will also function as a buffer.

The stabilized basic aqueous liquid detergent composition may also comprise other materials that are conventional ingredients of detergent compositions, provided each ingredient is compatible with the other ingredients of the stabilized basic aqueous liquid detergent composition, and the presence of the ingredient does not adversely affect the properties of the stabilized basic aqueous liquid detergent composition, especially the stability of the hydrogen peroxide. It has been found, for example, that ammonium salts adversely affect the stability of the hydrogen peroxide.

Each additional ingredient is used to modify the stabilized basic aqueous liquid detergent composition in conventional form and is present in an effective amount, that is, in the amount required to achieve the desired effect without adversely affecting the properties of the composition. Other conventional ingredients, which are well known to those skilled in the art, include, for example, cationic surfactants, zwitterionic (amphoteric) surfactants: perfumes and fragrances; fluorescent whitening agent (optical whiteners or brighteners); soil release agents; anti-redeposition agent; dyes and other colorants; fabric softening compositions; static control agents; suds regulants, such as dimethylpolysiloxane; and bactericides. The stabilized basic aqueous liquid detergent composition may comprise a fluorescent whitening agent or mixture of fluorescent whitening agents, typically, when present, at about 0.1 wt % to 1.0 wt %. The stabilized basic aqueous liquid detergent composition may comprise perfumes and/or fragrances, typically, when present, at about 0.03 wt % to about 0.5 wt % of the composition. The stabilized basic aqueous liquid detergent composition may comprise an anti-redeposition agent, such as, polyvinyl pyrrolidone, hydroxyethyl cellulose, sodium carboxymethyl cellulose, and hydroxypropyl ethyl cellulose, typically, when present, at about 0.5 wt % to about 10 wt %, more preferably about 0.75 wt % to about 8 wt %, most preferably about 1 wt % to about 6 wt %, of the composition.

After all the other ingredients have been accounted for, water comprises the balance of the stabilized basic aqueous liquid detergent composition. Other solvents, such as water miscible organic solvents are not necessary. Like all the other ingredients, the water should be free from metal ions that would catalyze decomposition of hydrogen peroxide, such as ferrous ions, ferric ions, cupric ions, cuprous ions, manganous ions, and similar transition metal ions. The water should also be free from organic material that would be oxidized by hydrogen peroxide. The water, and the other ingredients, should also be free of inorganic materials that would react with hydrogen peroxide, such as chlorine ($Cl_2$), hypochorous acid (HOCl), and sodium hypochlorite (NaOCl). Distilled or deionized water is preferred.

Active Oxygen Loss

Active oxygen loss is measured by heating the stabilized basic aqueous liquid detergent composition in an 85±1° C. oven for 24 hours. The peroxide concentration in the sample is measured before and after heating, by, for example, the permanganate titration method. The active oxygen loss (A.O. Loss) is calculated by:

$$A.O. \text{ Loss} = \frac{[H_2O_2]_{start} - [H_2O_2]_{end}}{[H_2O_2]_{start}} \times 100\%$$

In which $[H_2O_2]_{start}$ is the hydrogen peroxide concentration before heating, and $[H_2O_2]_{end}$ is the hydrogen peroxide concentration after heating.

The stabilized basic aqueous liquid detergent composition has an A.O. Loss after heating in an 85±1° C. oven for 24 hours of less than 20%, typically less than 15%, and more typically less than 12%. Preferably the A.O. loss is less than 10%, more preferably less than 8% and even more preferably less than 5%.

Preparation of the Stabilized Basic Aqueous Liquid Detergent Composition

The stabilized basic aqueous liquid detergent composition can be prepared by adding the ingredients together and mixing, typically without any external heating. No particular order of mixing is necessary, but the hydrogen peroxide is typically added last.

Alternatively, the stabilized basic aqueous liquid detergent composition may be prepared by adding each of the three stabilizers to an aqueous hydrogen peroxide solution before it is added to the composition. As will be apparent to those skilled in the art, the concentration of hydrogen peroxide and of each of the stabilizers before addition to the composition must be more than that desired in the final stabilized basic aqueous liquid detergent composition because the stabilized hydrogen peroxide solution will be diluted by the other ingredients. A commercially available stabilized hydrogen peroxide composition that comprises hydrogen peroxide and the three stabilizers in the appropriate amounts may also be used.

INDUSTRIAL APPLICABILITY

The hydrogen peroxide containing stabilized basic aqueous liquid detergent compositions of the invention may be used as cleaning agent for substrates, especially for fabrics. They are both as through-the-wash and pre-treatment cleaning agents. When used as pre-treatment cleaning agents, an effective amount of the composition is applied to the fabric by any of a number of methods. The composition may be sprayed onto the fabric by means of either a mechanical spraying apparatus including a pump or an aerosol spray, or sprinkled or poured onto the fabrics. Pre-treatment can be carried out on the entire fabric if it is heavily soiled or only upon those areas which require special pretreatment. Subsequently the fabric may be washed in any conventional manner using the stabilized basic aqueous liquid detergent composition or any conventional detergent or soap.

The advantageous properties of this invention can be observed by reference to the following examples, which illustrate but do not limit the invention.

EXAMPLES

| Glossary | |
|---|---|
| CALSOFT ® AOS40 | Sodium Alpha Olefin ($C_{14-16}$) Sulfonate (40%) (Pilot Chemical, Cincinnati, OH USA) |
| CALSOFT ® LAS99 | Linear Alkylbenzene sulfonate (99%) (Pilot Chemical, Cincinnati, OH USA) |
| CALSOFT ® SLS30 | Sodium Dodecyl Sulfonate (30%) (Pilot Chemical, Cincinnati, OH USA) |
| Disodium pyrophosphate | $Na_2H_2P_2O_7$ (Sigma, St. Louis, MO, USA) |
| DEQUEST ® 2010 | 1-Hydroxyethylidene-1,1-diphosphonic acid (Solutia, St. Louis, MO, USA) |
| DTPA | Diethylenetriaminepentaacetic acid, DEQUEST ® 2066 (DTPA) (Solutia, St. Louis, MO, USA) |
| P1 | Diethylene triamine penta(methylene phosphonic acid), DEQUEST ® 2066 (DTPA) (Solutia, St. Louis, MO, USA) |
| Sal | Salicylic acid (o-hydroxybenzoic acid) (Aldrich, Milwaukee, WI, USA) |
| Stannate (Sn) | Sodium stannate, $Na_2SnO_3 \cdot 3H_2O$ (Aldrich, Milwaukee, WI, USA) |
| TINOPAL ® CBS-X | Fluorescent whitening agent (Ciba Specialty Chemicals, Tarrytown NY USA) |
| TOMADOL ® 1-9 | Alcohol ethoxylate, non-ionic surfactant made from linear C11 alcohol with 9 moles (average) of ethylene oxide (Tomah Products, Milton, WI USA) |

Example 1

This Example illustrates preparation and evaluation of a stabilized basic aqueous liquid detergent composition of the invention. The following composition was prepared: CALSOFT® LAS99, 3 wt %; CALSOFT® SLS30, 2 wt %; CALSOFT® AOS40, 3 wt %; TOMADOL® 1-9, 6 wt %; DTPA, 0.5 wt %; 50% hydrogen peroxide, 8 wt % (hydrogen peroxide concentration in detergent—4 wt %); citric acid, 4 wt %; stannate, about 90 ppm; DEQUEST® 2010, about 45 ppm; salicylic acid, about 50 ppm; sodium hydroxide, to adjust the pH of the composition to pH 8; and water, to 100%.

The cleaning performance of this composition was evaluated using full-scale washing machines and fresh stained fabrics following ASTM D-4265. Removal of twelve common stains from cotton and cotton/polyester as fabric material was evaluated. The results are shown in FIG. 1.

Example 2

This Example illustrates preparation and evaluation of a stabilized basic aqueous liquid detergent composition of the invention. The composition was similar to that of Example 1, except that it also comprises a fluorescent whitening agent.

The following composition was prepared: CALSOFT® LAS99, 3 wt %; CALSOFT® SLS30, 2 wt %; CALSOFT® AOS40, 3 wt %; TOMADOL® 1-9, 6 wt %; DTPA, 0.5 wt %; 50% hydrogen peroxide, 8 wt % (hydrogen peroxide in detergent, 4 wt %); citric acid, 4 wt %; TINOPAL CBS-X, 0.075 wt %; stannate, about 90 ppm; DEQUEST® 2010, about 45 ppm; salicylic acid, about 50 ppm; sodium hydroxide, to adjust the pH of the composition to pH 8; and water, to 100%.

The compositions of Example 1 and Example 2 were heated in an 85±1° C. oven for 24 hours. The peroxide concentration was tested with permanganate titration method before and after. The active oxygen loss (A.O. Loss) is calculated as:

$$A.O. \; Loss = \frac{[H_2O_2]_{start} - [H_2O_2]_{end}}{[H_2O_2]_{start}} \times 100\%$$

Any sample with active oxygen loss less than 5% is considered stable.

The results are shown in Table 1.

TABLE 1

Stability of Compositions of Example 1 and Example 2

| Example # | $[H_2O_2]_{start}$ | $[H_2O_2]_{end}$ | A.O. Loss (%) | Phase |
|---|---|---|---|---|
| 1 | 4.01 | 3.84 | 4.2 | Natural yellowish color Remains single phase |
| 2 | 3.99 | 3.83 | 4.0 | Natural yellowish color Remains single phase |

Only 4% of the active oxygen was lost during the test. The compositions remained as a single homogeneous phase throughout the test. Any composition with active oxygen loss less than 5% is considered stable.

Example 3

This Example illustrates a comparison in cleaning performance between a stabilized basic aqueous liquid detergent composition of the invention and similar composition does not contain hydrogen peroxide.

A composition similar to the composition of Example 1, except that it contained no hydrogen peroxide, was prepared. The composition contained: CALSOFT® LAS99, 3 wt %; CALSOFT® SLS30, 2 wt %; CALSOFT® AOS40, 3 wt %; TOMADOL® 1-9, 6 wt %; DTPA, 0.5 wt %; citric acid, 4 wt %; sodium hydroxide, to adjust the pH of the composition to pH 8; and water, to 100%.

Figure 2:
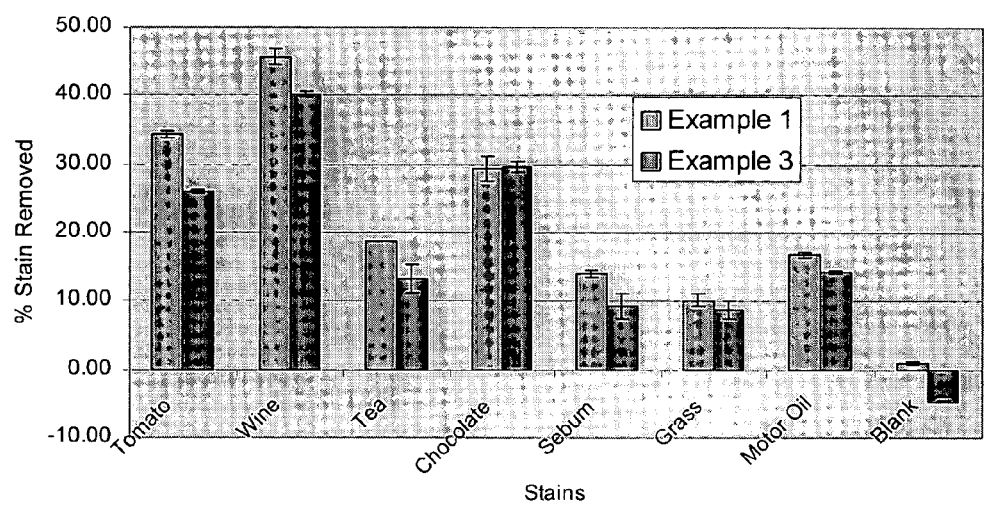
FIG. 2 shows a comparison of cleaning performance of the composition of Example 1 and the composition of Example 3.

A comparison in cleaning performance between the stabilized basic aqueous liquid detergent composition of Example 1, which contains hydrogen peroxide and stabilizers, and Example 3, which does not contain hydrogen peroxide, is shown in FIG. 2. The two compositions are comparable in removal of grass stain and chocolate. However, the composition of Example 1 was superior to the composition of Example 3 in removal of tomato, wine, tea, sebum, and motor oils. The composition of Example 1 also caused less discoloration of blank fabric.

Examples 4-7

These examples illustrate preparation and evaluation of stabilized basic aqueous liquid detergent compositions of the invention.

Example 4

The following composition was prepared: myristamine oxide, 0.50%; sodium lauryl ether sulfate (3 mole of ethylene oxide, 1.00%; linear alkyl benzene sulfonate, 4.00%; C12/C16 fatty alcohol polyglycol ether (3 moles of ethylene oxide), 3.00%; sodium lauryl sulfate, 3.00%; citric acid, 2.00%; hydrogen peroxide, as indicated in Table 2; stannate, about 90 ppm; DEQUEST® 2010, about 45 ppm; salicylic acid, about 50 ppm; sodium hydroxide, to adjust pH; and water, to 100%.

Example 5

The following composition was prepared: sodium petroleum sulfonate, 2.00%; linear alkyl benzene sulfonates, 3.00%; C12/C16 fatty alcohol polyglycol ether (7 moles of ethylene oxide), 3.00%; sodium lauryl sulfate, 1.00%; citric acid, 2.00%; hydrogen peroxide, as indicated in Table 2; stannate, about 90 ppm; DEQUEST® 2010, about 45 ppm; salicylic acid, about 50 ppm; sodium hydroxide, to adjust pH; and water, to 100%.

Example 6

The following composition was prepared: methyl ester of soybean oil, 1.20%; sodium alpha olefin sulfonates, 4.00%; C11 fatty alcohol polyglycol ether (9 ethylene oxide), 5.00%; citric acid, 3.00%; DTPA, 0.20%; hydrogen peroxide, as indicted in Table 2; stannate, about 90 ppm; DEQUEST® 2010, about 45 ppm; salicylic acid, about 50 ppm; sodium hydroxide to adjust pH; water, to 100%.

Example 7

The following composition was prepared: linear alkyl benzene sulfonates, 3.00%; sodium alpha olefin sulfonates, 6.00%; C12/C13 fatty alcohol polyglycol ether (6.5 moles of ethylene oxide), 3.00%; sodium xylenesulfonate, 6.00%; citric acid, 15.00%; hydrogen peroxide as indicted in Table 2; stannate, about 90 ppm; DEQUEST® 2010, about 45 ppm; salicylic acid, about 50 ppm; sodium hydroxide, to adjust pH: and water, to 100%.

The samples were heated for the times and at the temperatures shown in Table 2. The peroxide concentration was determined by permanganate titration before and after heating. Peroxide loss was calculated as described in Example 2. Any sample with active oxygen loss less than 5% is considered stable.

TABLE 2

Stability of $H_2O_2$ in the presence of detergent compositions

| Example # | [Surfactant] (% wt) | [$H_2O_2$] (% wt) | pH | Test Temp (° C.) | Test Time (days) | A.O. Loss (%) | Appearance |
|---|---|---|---|---|---|---|---|
| 4 | 11.5 | 3.95 | 8.0 | 85 | 1 | 4.0 | Uniform |
| 5 | 9 | 3.93 | 7.0 | 85 | 1 | 2.1 | Uniform |
| 5 | 9 | 4.04 | 8.0 | 60 | 14 | 4.7 | Uniform |
| 5 | 9 | 3.79 | 9.6 | 60 | 14 | 4.6 | Uniform |
| 6 | 10.2 | 3.93 | 7.1 | 85 | 1 | 1.8 | Uniform |
| 6 | 10.2 | 3.90 | 8.0 | 85 | 1 | 2.3 | Uniform |
| 6 | 10.2 | 3.78 | 9.0 | 60 | 14 | 4.9 | Uniform |
| 7 | 12 | 4.10 | 7.0 | 45 | 20 | 4.7 | Uniform |
| 7 | 12 | 4.23 | 8.0 | 45 | 20 | 4.9 | Uniform |

These examples show that a range of surfactants, hydrotropes, builders, and chelating agents can be used to formulate a stable concentrated detergent composition with hydrogen peroxide at pH 7 and higher.

Example 8

This example is to show that hydrogen peroxide is not compatible with ammonium based compositions.

The stability of hydrogen peroxide in the presence of three different ammonium compounds was investigated. The samples listed in Table 3 were heated in an 85±1° C. oven for 24 hours. In addition, the composition comprised stannate, about 90 ppm; DEQUEST® 2010, about 45 ppm; and salicylic acid, about 50 ppm. The peroxide concentration was measured before and after heating as described in Example 2.

TABLE 3

The stability of $H_2O_2$ in the presence of ammonium compounds

| Salt | [Salt] (% wt) | [$NH_4$] (% wt) | pH | [$H_2O_2$] (% wt) | A.O. Loss (%) |
|---|---|---|---|---|---|
| Ammonium Dihydrogen Phosphate | 9.45% | 1.48% | 7.1 | 3.82 | 63 |
| Ammonium Sulfate | 9.37% | 2.55% | 7.0 | 3.83 | 40 |
| Ammonium Chloride | 4.39% | 1.48% | 7.0 | 4.04 | 52 |

As shown in Table 3, over 40% of the active oxygen was lost during the test regardless of the anion chosen. This demonstrates that hydrogen peroxide is not compatible with ammonium based compositions.

Example 9

This example shows that the standard commercial hydrogen peroxide cannot be simply mixed with commercially available detergent composition to produce compositions in which the hydrogen peroxide is stable.

Hydrogen peroxide was added to the commercially available detergent compositions listed in Table 4, and the resulting samples heated as shown in the table. The peroxide concentration was measured before and after heating as described in Example 2. Standard commercial hydrogen peroxide containing about 30 ppm of sodium nitrite, about 10 ppm of stannate stabilizer, and about 10 ppm of DEQUEST® 2010 was added to the samples of liquid TIDE® detergent and liquid PUREX® detergent. Hydrogen peroxide that did not contain these stabilizers was added to the liquid SUN® detergent and liquid KIRKLAND® detergent. Stannate (about 90 ppm), DEQUEST® 2010 (about 45 ppm), and salicylic acid (about 50 ppm) were added to the liquid SUN® detergent and liquid KIRKLAND® detergent.

TABLE 4

Stability of $H_2O_2$ in the presence of commercially available detergents

| Brand | [$H_2O_2$] (% wt) | pH | Test Temp. (° C.) | Test Time (days) | A.O. Loss (%) |
|---|---|---|---|---|---|
| Liquid TIDE ®* | 3.47 | 7.0 | 40 | 8 | 19 |
| Liquid PUREX ® | 3.23 | 9.0 | 40 | 8 | 100 |
| Liquid SUN ® | 2.38 | 8.7 | 85 | 1 | 15 |
| Liquid KIRKLAND ® | 2.60 | 8.1 | 85 | 1 | 85 |

*At the end of the test, Liquid TIDE ® separated into two phases.

As shown above, none of the commercially available detergents was compatible with hydrogen peroxide.

Example 10

This example illustrates the stability of hydrogen peroxide in the presence of disodium pyrophosphate ($Na_2H_2P_2O_7$). Aqueous basic (pH of 9.5) hydrogen peroxide compositions containing about 5 wt % hydrogen peroxide and different levels of stannate and/or disodium pyrophosphate were stored at 96° C. for 16 hours and the amount of peroxide remaining analyzed as in Example 2. The results are shown in Table 5.

TABLE 5

| Example number | Stannate (ppm) | $Na_2H_2P_2O_7$ (ppm) | Start Conc (wt %) | End Conc (wt %) | A.O. Loss (%) |
|---|---|---|---|---|---|
| 10-A | 100 | 0 | 4.98 | 3.61 | 27.5 |
| 10-B | 300 | 100 | 4.95 | 1.35 | 72.7 |
| 10-C | 100 | 300 | 4.95 | 1.26 | 74.5 |
| 10-D | 0 | 400 | 4.95 | 0 | 100.0 |

These examples show that the stability of hydrogen peroxide decreases when a pyrophosphate is present.

Example 11

This example illustrates the stability of aqueous hydrogen peroxide compositions in the presence of a metal impurity. Hydrogen peroxide is unstable in the presence of metal ions. Measurement of the stability of hydrogen peroxide in the presence of metal ions, in particular in the presence of Fe(II), indicates which compositions will perform in cosmetic and cleaning applications.

Examples 11-A to 11-F, each containing 3 wt % aqueous hydrogen peroxide, were prepared. The ingredients added to each sample are listed Table 6. In each example that contains stannate, the stannate concentration was 90 ppm. In each example that contains the phosphonic acid chelating agent, the phosphonic acid chelating agent concentration was 45 ppm. In each example that contains salicylic acid, the salicylic acid concentration is 50 ppm. The pH was adjusted to pH 9 with aqueous sodium hydroxide. Each sample was spiked with 1 ppm Fe(II) and stored 85° C. for 24 hours. The amount of hydrogen peroxide in each sample was measured by titration with potassium permanganate as in Example 2.

The amount of hydrogen peroxide lost is the difference between the initial concentration of hydrogen peroxide and the concentration of hydrogen peroxide after 24 hours, divided by the initial concentration of hydrogen peroxide.

TABLE 6[a]

| Example # | Additives | A.O. Loss (%) |
|---|---|---|
| 11-A | Sn | 13.2 |
| 11-B | P1 | 100.0 |
| 11-C | Sal | 100.0 |
| 11-D | Sn, P1 | 14.2 |
| 11-E | Sn, Sal | 15.6 |
| 11-F | Sn, P1, Sal | 9.8 |

[a]Each sample initially contained 3 wt % hydrogen peroxide. 1 ppm of Fe(II) was added to each sample.

Sample 11-A, 11-B, and 11-C each contain only one of the three components of the stabilizer. Examples 11-D and 11-E each contain two of the three components. Sample 11-F contains all three components. The combination of all three components performs better than any individual ingredient and better than any of the combinations of two ingredients tested. Greater than 90% of the hydrogen peroxide was retained under the conditions of the evaluation.

Example 12

This example illustrates the stability of aqueous hydrogen peroxide compositions in the presence of different concentration of Sn stabilizer. The procedure of Example 11 was repeated, with 1 ppm Fe(II) were added. The ingredients added and the results are shown in Table 7.

TABLE 7[a]

| Example # | Additive (ppm) | A.O. Loss (%) |
|---|---|---|
| 11-A | Sn (90) | 13.2 |
| 12-A | Sn (300) | 11.4 |
| 11-F | Sn (90), P1 (45), Sal (50) | 9.8 |

[a]Each sample initially contained 3 wt % hydrogen peroxide. 1 ppm of Fe(II) was added to each sample.

This example shows that 300 ppm stannate stabilizer (Sn) alone is not as effective as the combination of 90 ppm stannate stabilizer (Sn), 45 ppm of diethylene triamine penta(methylene phosphonic acid) (P1), and 50 ppm of salicylic acid (Sal) in stabilizing hydrogen peroxide under alkaline conditions.

Example 13

This example illustrates the stability of hydrogen peroxide in the presence of different level of metal impurities. The procedure of Example 11 was repeated, except that the different concentrations of Fe(II) were added. The ingredients added and the results are show in Table 8. The stabilizer concentrations were as in Example 11.

TABLE 8[a]

| | | Fe(II) (ppm) | | | |
|---|---|---|---|---|---|
| | | 0 ppm | 0.02 ppm | 0.2 ppm | 1 ppm |
| Example # | Additive | A.O. Loss (%) | | | |
| 13-A | Sn | 13.9 | 11.5 | 12.2 | 13.2 |
| 13-B | Sn, Sal | 12.5 | 13.9 | 14.9 | 15.6 |
| 11-D | Sn, P1 | ND | ND | ND | 14.2 |
| 13-C | Sn, P1, Sal | 17.7 | 10.8 | 10.5 | 9.8 |

[a]Each sample initially contained 3 wt % hydrogen peroxide. ND = Not determined.

In the presence of Fe(II), the combination of all three components is more effective than sodium stannate (Sn) or the combination of sodium stannate (Sn) and salicylic acid (Sal).

Example 14

This example illustrates stability of hydrogen peroxide in the presence of a surfactant. A composition containing 3 wt % hydrogen peroxide, 1 wt % amine oxide surfactant, and a stabilizer system containing 90 ppm stannate, 45 ppm HEDP, and 50 ppm salicylic acid, and was adjusted to a pH of 9 and stored at 85° C. After 24 hours, the composition was analyzed for hydrogen peroxide as in Example 1. 86.8% of the hydrogen peroxide was retained.

We claim:

1. A stabilized basic aqueous liquid detergent composition comprising:
   a) 0.1 wt % to 15% of hydrogen peroxide;
   b) about 10 ppm by weight to about 1 wt % of a stannate stabilizer;
   c) at least about 10 ppm by weight of a phosphonic acid chelating agent or a mixture of phosphonic acid chelating agents;
   d) at least about 10 ppm by weight of an aromatic chelating agent or a mixture of aromatic chelating agents;
   e) optionally, a sequestrant or a mixture of sequestrants;
   f) 0.1 wt % to 60 wt % of an anionic surfactant or mixture of anionic surfactants;
   g) 0.1 wt % to 60 wt % of a non-ionic surfactant or mixture of anionic surfactants;
   e) 0.1 wt % to 60 wt % of a builder or a mixture of builders; and
   f) water;
   in which:
   the phosphonic acid chelating agent or agents, the aromatic chelating agent or agents, and the sequestrant or sequestrants together comprise about 20 ppm by weight to 10 wt % of the composition;
   the composition comprises less than about 10 ppm of pyrophosphate;
   the composition has a pH greater than 7.0; and
   the amount of active oxygen lost when the composition is heated at 85±1° C. for 24 hours is 20% or less.

2. The liquid detergent composition of claim 1 in which the composition comprises:
   2 wt % to 8 wt % of the hydrogen peroxide;
   about 15 ppm to about 2500 ppm of the stannate stabilizer;
   at least about 15 ppm of the phosphonic acid chelating agent or a mixture of phosphonic acid chelating agents;
   at least about 15 ppm by weight of the aromatic chelating agent or a mixture of aromatic chelating agents; and
   the phosphonic acid chelating agent or agents, the aromatic chelating agent or agents, and the sequestrant or sequestrants together comprise about 30 ppm by weight to 7.5 wt % of the composition.

3. The liquid detergent composition of claim 2 in which the composition comprises:
   about 1 wt % to 30 wt % of an anionic surfactant or mixture of anionic surfactants;
   about 1 wt % to 30 wt % of a non-ionic surfactant or mixture of anionic surfactants; and
   about 1 wt % to 30 wt % of a builder or a mixture of builders.

4. The liquid detergent composition of claim 3 in which the composition has a pH of about 8.0 to about 10.5.

5. The liquid detergent composition of claim 4 in which the composition comprises less than about 1 ppm of pyrophosphate.

6. The liquid detergent composition of claim 5 in which:
   the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and
   the aromatic chelating agent is selected from the group consisting of salicylic acid, 6-hydroxy-picolinic acid, 8-hydroxy-quinoline, and mixtures thereof.

7. The liquid detergent composition of claim 6 in which the composition has a pH of about 8.0 to about 9.5.

8. The liquid detergent composition of claim 1 in which:
   about 20 ppm to about 1000 ppm of the stannate stabilizer;
   at least about 20 ppm of the phosphonic acid chelating agent or a mixture of phosphonic acid chelating agents;
   at least about 20 ppm by weight of the aromatic chelating agent or a mixture of aromatic chelating agents; and
   the phosphonic acid chelating agent or agents, the aromatic chelating agent or agents, and the sequestrant or sequestrants together comprise about 40 ppm by weight to 5.0 wt % of the composition.

9. The liquid detergent composition of claim 8 in which the composition has a pH of 8.0 to 9.5.

10. The liquid detergent composition of claim 9 in which the amount of active oxygen lost when the composition is heated at 85±1° C. for 24 hours is 10% or less.

11. The liquid detergent composition of claim 10 in which:
    the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and
    the aromatic chelating agent is selected from the group consisting of salicylic acid, 6-hydroxy-picolinic acid, 8-hydroxy-quinoline, and mixtures thereof.

12. The liquid detergent composition of claim 11 in which:
    about 50 ppm to about 500 ppm of the stannate stabilizer;
    at least about 40 ppm of the phosphonic acid chelating agent or a mixture of phosphonic acid chelating agents;
    at least about 40 ppm by weight of the aromatic chelating agent or a mixture of aromatic chelating agents; and
    the phosphonic acid chelating agent or agents, the aromatic chelating agent or agents, and the sequestrant or sequestrants together comprise about 80 ppm by weight to 2.5 wt % of the composition.

13. The liquid detergent composition of claim 12 in which the composition comprises about 1 wt % to 30 wt % of an anionic surfactant or mixture of anionic surfactants; about 1 wt % to 30 wt % of a non-ionic surfactant or mixture of anionic surfactants; and about 1 wt % to 30 wt % of a builder or a mixture of builders.

14. The liquid detergent composition of claim 13 in which the composition comprises:
    about 60 ppm to about 200 ppm of the stannate stabilizer; and
    the amount of active oxygen lost when the composition is heated at 85±1° C. for 24 hours is 8% or less.

15. The liquid detergent composition of claim 14 in which the amount of active oxygen lost when the composition is heated at 85±1° C. for 24 hours is 5% or less.

16. The liquid detergent composition of claim 1 in which the amount of active oxygen lost when the composition is heated at 85±1° C. for 24 hours is 5% or less.

17. A method of cleaning a substrate, the method comprising the steps of:
(1) applying a stabilized basic aqueous liquid detergent composition to a substrate, the composition comprising:
a) 0.1 wt % to 15% of hydrogen peroxide;
b) about 10 ppm by weight to about 1 wt % of a stannate stabilizer;
c) at least about 10 ppm by weight of a phosphonic acid chelating agent or a mixture of phosphonic acid chelating agents;
d) at least about 10 ppm by weight of an aromatic chelating agent or a mixture of aromatic chelating agents;
e) optionally, a sequestrant or a mixture of sequestrants;
f) 0.1 wt % to 60 wt % of an anionic surfactant or mixture of anionic surfactants;
g) 0.1 wt % to 60 wt % of a non-ionic surfactant or mixture of anionic surfactants;
e) 0.1 wt % to 60 wt % of a builder or a mixture of builders; and
f) water;
in which:
the phosphonic acid chelating agent or agents, the aromatic chelating agent or agents, and the sequestrant or sequestrants together comprise about 20 ppm by weight to 10 wt % of the composition;
the composition comprises less than about 10 ppm of pyrophosphate;
the composition has a pH greater than 7.0; and
the amount of active oxygen lost when the composition is heated at 85±1° C. for 24 hours is 20% or less;
(2) removing the composition from the substrate.

18. The method of claim 17 in which the substrate is a fabric.

19. The method of claim 18 in which in which the composition has a pH of about 8.0 to about 9.5.

20. The method of claim 19 in which:
the composition comprises about 1 wt % to 30 wt % of an anionic surfactant or mixture of anionic surfactants; about 1 wt % to 30 wt % of a non-ionic surfactant or mixture of anionic surfactants; about 1 wt % to 30 wt % of a builder or a mixture of builders; about 50 ppm to about 500 ppm of the stannate stabilizer, at least about 40 ppm of the phosphonic acid chelating agent or a mixture of phosphonic acid chelating agents, and at least about 40 ppm by weight of the aromatic chelating agent or a mixture of aromatic chelating agents; and
the phosphonic acid chelating agent or agents, the aromatic chelating agent or agents, and the sequestrant or sequestrants together comprise about 80 ppm by weight to 2.5 wt % of the composition.

21. The method of claim 20 in which:
the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and the aromatic chelating agent is selected from the group consisting of salicylic acid, 6-hydroxy-picolinic acid, 8-hydroxyquinoline, and mixtures thereof.

22. The method of claim 21 in which the composition comprises less than about 1 ppm of pyrophosphate.

23. The method of claim 22 in which the composition comprises about 60 ppm to about 200 ppm of the stannate stabilizer; at least about 40 ppm of the phosphonic acid chelating agent or a mixture of phosphonic acid chelating agents; at least about 40 ppm by weight of the aromatic chelating agent or a mixture of aromatic chelating agents; and the phosphonic acid chelating agent or agents, the aromatic chelating agent or agents, and the sequestrant or sequestrants together comprise about 80 ppm by weight to 2.5 wt % of the composition.

24. The method of claim 23 in which the amount of active oxygen lost when the composition is heated at 85±1° C. for 24 hours is 5% or less.

25. The method of claim 17 in which the amount of active oxygen lost when the composition is heated at 85±1° C. for 24 hours is 5% or less.

* * * * *